(12) United States Patent
Shao et al.

(10) Patent No.: US 11,687,067 B2
(45) Date of Patent: Jun. 27, 2023

(54) PATTERN CLASSIFICATION SYSTEM WITH SMART DATA COLLECTION FOR ENVIRONMENTAL CONTROL SYSTEM FAULT ISOLATION

(71) Applicant: Honeywell International Inc., Morris Plains, NJ (US)

(72) Inventors: Qingqiu Shao, Oro Valley, AZ (US); Gary Kumagai, Walnut, CA (US); Bin Dong, Beijing (CN); Kyusung Kim, Plymouth, MN (US); Mohit Singhai, Chandler, AZ (US)

(73) Assignee: Honeywell International Inc., Charlotte, NC (US)

( * ) Notice: Subject to any disclaimer, the term of this patent is extended or adjusted under 35 U.S.C. 154(b) by 390 days.

(21) Appl. No.: 16/837,194

(22) Filed: Apr. 1, 2020

(65) Prior Publication Data
US 2020/0320803 A1 Oct. 8, 2020

Related U.S. Application Data

(60) Provisional application No. 62/829,238, filed on Apr. 4, 2019.

(51) Int. Cl.
*G05B 23/02* (2006.01)
*G06N 20/00* (2019.01)
(Continued)

(52) U.S. Cl.
CPC ......... *G05B 23/0213* (2013.01); *B64D 45/00* (2013.01); *G06F 18/24* (2023.01);
(Continued)

(58) Field of Classification Search
None
See application file for complete search history.

(56) References Cited

U.S. PATENT DOCUMENTS 5,047,942 A * 9/1991 Middleton ........... G05D 1/0083
701/16
9,561,863 B2 * 2/2017 Conrad ............... G01M 5/0033
(Continued)

FOREIGN PATENT DOCUMENTS

CN 109592045 A * 4/2019
CN 108959778 B * 9/2020 ............ G06F 30/20
(Continued)

*Primary Examiner* — Abdhesh K Jha
(74) *Attorney, Agent, or Firm* — Bookoff McAndrews, PLLC

(57) ABSTRACT

According to certain aspects of the disclosure, a computer-implemented method may be used for detecting health status of an environmental control system. The method may include receiving aircraft data of an aircraft and receiving flight data of an aircraft. Calculating a predicted performance of the aircraft based on the received aircraft data and the received flight data and generating at least one model scalar or residual, wherein the at least one model scalar or residual is generated based on the aircraft data of the aircraft. Identifying at least one pattern from the at least one model scalar or residual and classifying the at least one pattern into at least one of a plurality of classifications. Identifying a failure of modes or components from the classifications and transmitting a maintenance report once the failure of modes or components is identified.

19 Claims, 9 Drawing Sheets

(51) Int. Cl.
    *B64D 45/00*           (2006.01)
    *G07C 5/00*            (2006.01)
    *G07C 5/08*            (2006.01)
    *G06F 18/24*          (2023.01)

(52) U.S. Cl.
    CPC ............ *G06N 20/00* (2019.01); *G07C 5/006* (2013.01); *G07C 5/008* (2013.01); *G07C 5/0808* (2013.01); *B64D 2045/0085* (2013.01)

(56) References Cited

U.S. PATENT DOCUMENTS

| | | | |
|---|---|---|---|
| 9,724,979 | B1 | 8/2017 | Thumati et al. |
| 9,971,969 | B2 * | 5/2018 | Horabin .................. G06N 5/04 |
| 2009/0037772 | A1 | 2/2009 | Wegerich et al. |
| 2016/0052640 | A1 * | 2/2016 | Buehler ............... G07C 5/0808 340/945 |
| 2016/0086396 | A1 * | 3/2016 | Nutaro ................. G07C 5/0808 701/29.4 |
| 2019/0152578 | A1 * | 5/2019 | Dege ........................ B64C 3/56 |
| 2020/0110181 | A1 * | 4/2020 | Lu ....................... G05B 23/0221 |
| 2022/0048648 | A1 * | 2/2022 | Aaron ....................... B64F 5/60 |

FOREIGN PATENT DOCUMENTS

| | | | | |
|---|---|---|---|---|
| CN | 108304661 B | * | 5/2021 | ............ G01M 13/00 |
| CN | 112749789 A | * | 5/2021 | |
| EP | 3346345 A1 | | 7/2018 | |
| EP | 3460611 A1 | * | 3/2019 | ......... G05B 23/0221 |
| JP | 2020095298 A | * | 6/2020 | ........ B60W 50/0205 |
| RU | 2732646 C2 | * | 9/2020 | ............. B25J 11/00 |

\* cited by examiner

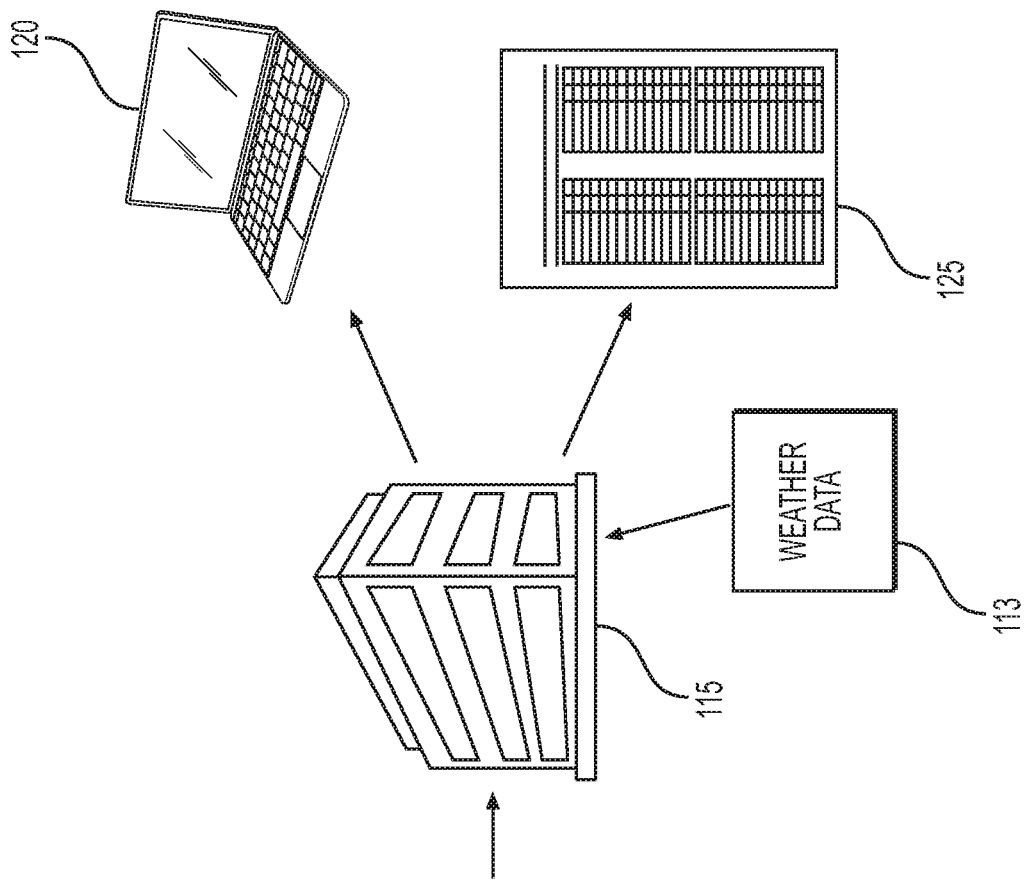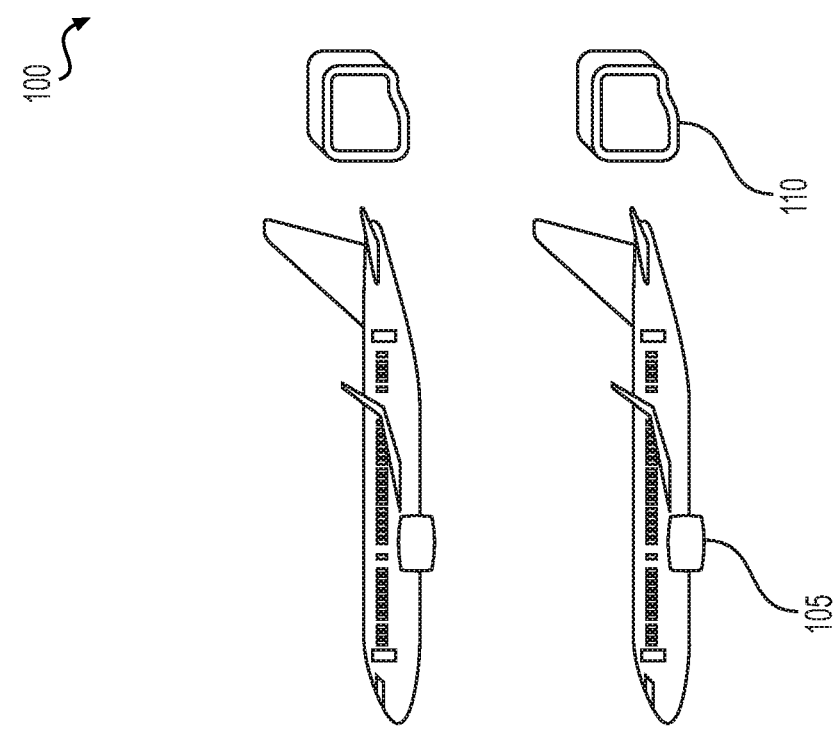
FIG. 1

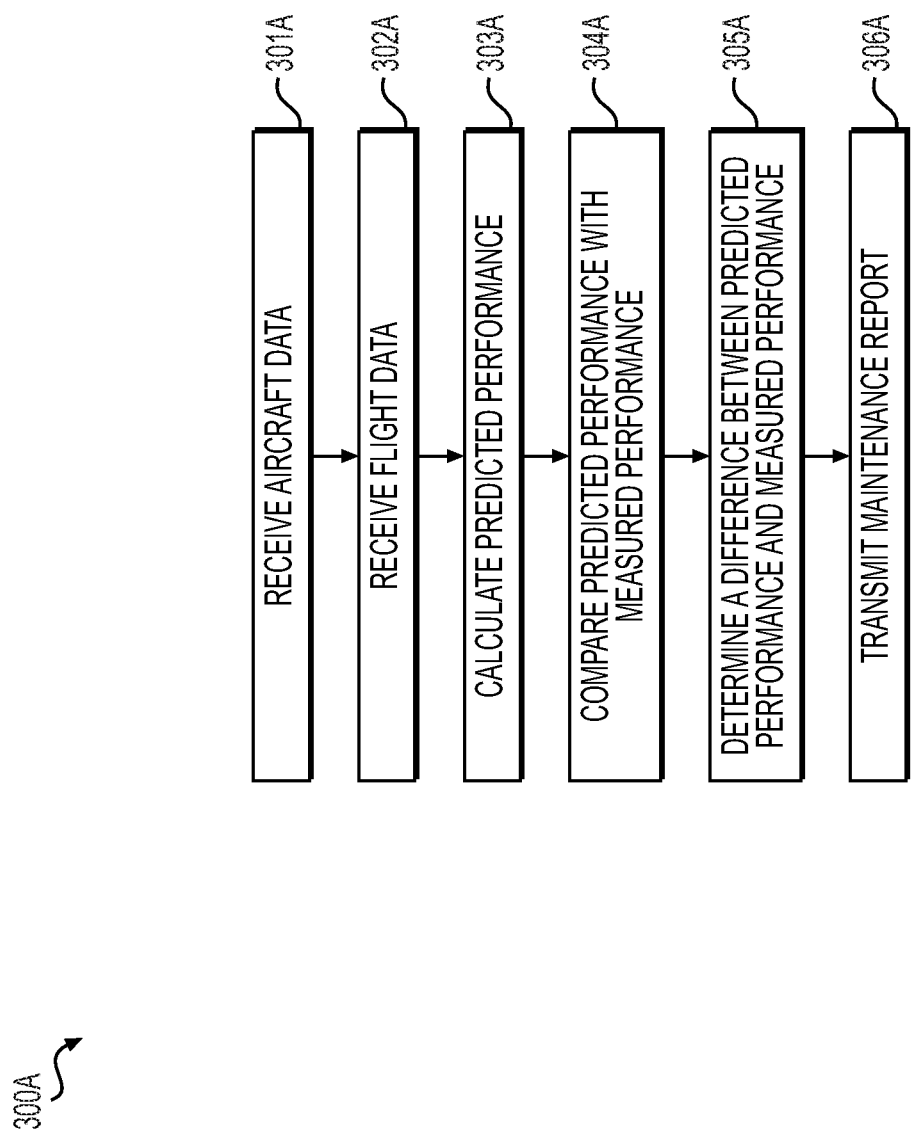

EDIT SAR CHANNEL 3

Name [ECS TEST]

Minimum Recording [120] seconds
Maximum Recording [99999] seconds
Maximum file [64] kilobyte ☐ Inhibit SAR Channel
☐ Inhibit Dumping Via M

[OK]  [Cancel]  [Purge]

Trigger Code

| | | |
|---|---|---|
| 01 | 5000 | ECS TEST |
| 02 | 0000 | (not defined) |
| 03 | 0000 | ? |
| 04 | 0000 | ? |
| 05 | 0000 | ? |
| 06 | 0000 | ? |
| 07 | 0000 | ? |

Parameters  [Add]   [Delete]    60 Slots    60 Samples

| Port | Label/SDIName | Mode | SSM | Sign | Bit | Rate | Scale | Offset | Comp. |
|---|---|---|---|---|---|---|---|---|---|
| 002 | 270 / XXPACK.1 | Disc | DIS | | | 1 | 1 | 0. | |
| 002 | 270 / XXPACK.2 | Disc | DIS | | | 1 | 1 | 0. | |
| 002 | 270 / XXPACK.1 | Disc | DIS | | | 1 | 1 | 0. | |
| 002 | 270 / XXPCKH.2 | Disc | DIS | | | 1 | 1 | 0. | |
| 002 | 270 / XXWAI | Disc | DIS | | | 1 | 1 | 0. | |
| 005 | 203 / XXALT | Num | BNR | N | 17 | 1 | 1. | 0. | 1. |
| 005 | 206 / XXCAS | Num | BNR | N | 14 | 1 | 0.0625 | 0. | 1. |
| 005 | 211 / XXTAT | Num | BNR | N | 11 | 1 | 0.25 | 0. | 0.25 |
| 016 | 100 / 00N1TA.1 | Num | BNR | N | 15 | 1 | 0.0078125 | 0. | 0.05 |

HONEYWELL | ECS MONITORING SYSTEM     NEED SUPPORT    LOG OUT    [GLOBAL AIRLINE]

Filter by: All ▼    [Tail Number 🔍]      ◯ MONITOR STATUS    ⬆ EXPORT

| Status⇅ | TAIL NUMBER | UPDATED TIME | FLEET | SAT | GW | RAT | PAT | TCV.O | TCV.C | FF | HISTORY |
|---|---|---|---|---|---|---|---|---|---|---|---|
| ⊕ | B-3400 | 2016.04.13-14:35 | GLOBAL... | 91.9428... | 822746 | L:78.21922...<br>R:87.26922... | 91.2492... | L:1<br>R:0 | L:0<br>R:0 | L:1.31<br>R:1.33 | ↺ |
| ⊕ | B-5400 | 2016.04.13-14:35 | GLOBAL... | 95.6130... | 867195 | L:72.43805...<br>R:81.44805... | 92.0880... | L:1<br>R:1 | L:1<br>R:0 | L:1.31<br>R:1.33 | ↺ |
| ⊕ | B-3401 | 2016.04.13-14:35 | GLOBAL... | 95.3946... | 996727 | L:76.16558...<br>R:96.85558... | 98.4355... | L:1<br>R:0 | L:1<br>R:1 | L:1.31<br>R:0.79 | ↺ |
| ⊕ | B-5401 | 2016.04.13-14:35 | GLOBAL... | 96.8070... | 683813 | L:95.38957...<br>R:93.53957... | 96.6995... | L:1<br>R:0 | L:1<br>R:0 | L:1.31<br>R:0.79 | ↺ |
| ⊕ | B-3402 | 2016.04.13-14:35 | GLOBAL... | 89.4386... | 548851 | L:83.64917...<br>R:78.46917... | 88.1091... | L:1<br>R:0 | L:1<br>R:1 | L:0.78<br>R:1.33 | ↺ |
| ⊕ | B-5402 | 2016.04.13-14:35 | GLOBAL... | 96.2933... | 690028 | L:91.80810...<br>R:78.09810... | 94.0481... | L:0<br>R:1 | L:1<br>R:1 | L:0.78<br>R:1.33 | ↺ |

FIG. 6A

PATTERN CLASSIFICATION SYSTEM WITH SMART DATA COLLECTION FOR ENVIRONMENTAL CONTROL SYSTEM FAULT ISOLATION

CROSS-REFERENCE TO RELATED APPLICATION(S)

This application claims the benefit of priority to U.S. Provisional Application No. 62/829,238, filed Apr. 4, 2019, which is hereby incorporated by reference in its entirety.

TECHNICAL FIELD

Various embodiments of the present disclosure generally relate to a connected service-oriented architecture of aircraft health status monitoring, and more particularly, to smartly collect data and isolate faults of the environmental control system (ECS).

BACKGROUND

Aircraft operate in various types of geographical areas, including areas with elevated levels of pollution. Pollutants may include dust, particulates, and other types of contaminants. Overtime pollutants accumulate in the elements of the environmental control system (ECS), and eventually these elements must be serviced or replaced in a maintenance operation. Premature replacement may result in unnecessary downtime and cost, while delayed replacement may result in operational inefficiencies, such as equipment failure and passenger discomfort. The present disclosure is directed to overcoming one or more of these issues.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF DISCLOSURE

According to certain aspects of the disclosure, systems and methods are disclosed to provide ECS fault isolation using real-time data and calculated predicted performance.

In one embodiment, a computer-implemented method is disclosed for detecting health status of an environmental control system. The computer implemented method may comprise: receiving, by a processor, aircraft data of an aircraft; receiving, by a processor, flight data of an aircraft; calculating, by a processor, a predicted performance of the aircraft based on the received aircraft data and the received flight data; comparing, by a processor, the predicted performance of the aircraft with a measured performance of the aircraft over a predetermined time period; determining, by a processor, a difference between the predicted performance of the aircraft and the measured performance of the aircraft over the predetermined time period; and transmitting, by a processor, a maintenance report once the determined difference is greater than a predetermined threshold.

In another embodiment, a computer implemented method is disclosed for detecting health status of an environmental control system. The computer implemented method may comprise: receiving, by a processor, aircraft data of an aircraft; receiving, by the processor, flight data of an aircraft; calculating, by the processor, a predicted performance of the aircraft based on the received aircraft data and the received flight data; generating, by the processor, at least one model scalar or residual, wherein the at least one model scalar or residual is generated based on the aircraft data of the aircraft; identifying, by the processor, at least one pattern from the at least one model scalar or residual; classifying, by the processor, the at least one pattern into at least one of a plurality of classifications; identifying, by the processor, a failure of modes or components from the classifications; and transmitting, by the processor, a maintenance report once the failure of modes or components is identified.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 1 depicts an overview of the pattern classification system for fault isolation.

FIG. 3A depicts a flowchart of an exemplary method for ECS fault isolation.

FIG. 4 depicts an exemplary user interface for Smart Aircraft Condition Monitoring System (ACMS) Recorder (SAR).

FIG. 6A depicts an exemplary user interface of the ECS Monitoring system.

DETAILED DESCRIPTION OF EMBODIMENTS

Figure 2:
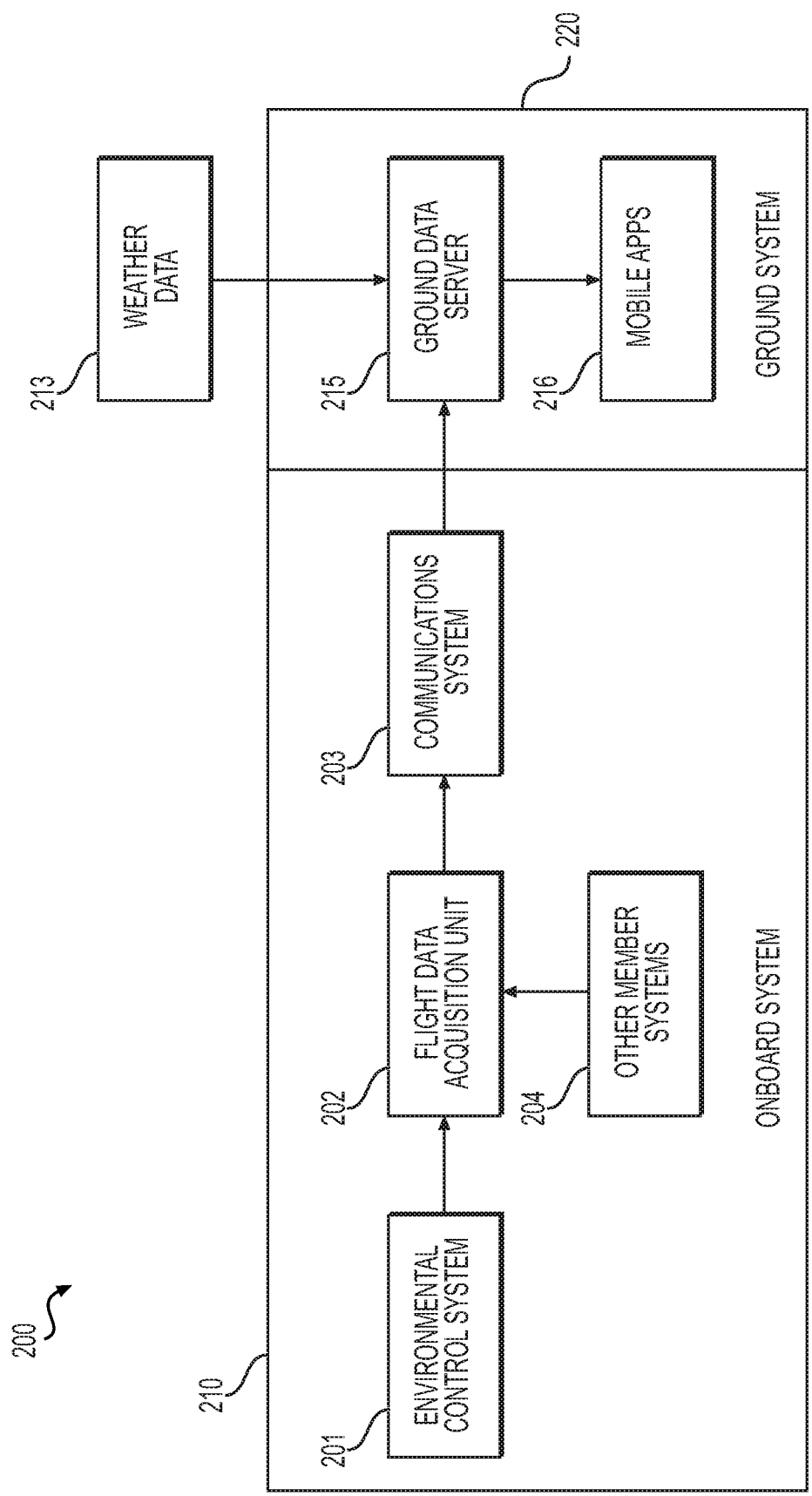
FIG. 2 depicts a focused view of the pattern classification system for fault isolation.

As discussed above, over time, pollutants accumulate in the elements of the electronic control system ("ECS") of an aircraft, and eventually these elements must be serviced or replaced in a maintenance operation. However, accurately predicting the appropriate time for the maintenance operation and replacement may be challenging. Accordingly, it is desirable to provide improved maintenance systems and methods that enable more timely and accurate replacement or cleaning of ECS elements, particularly heat exchangers, to minimize disruption and improve efficiency.

Compared to the current ways of monitoring ECS health, this unique approach combines onboard aircraft data, off board data, system analytical model results, and data analytics. In the exemplary system, existing sensors on the aircraft are used to minimize cost. The existing sensors may include the ram air sensor, pack out sensor, trim air valve switches, and temperature control valve switches. Wiring will be added to the aircraft to connect these to either the flight data recording systems and/or an additional recording element. New sensors may also be added for additional monitoring capabilities. These new sensors may include primary hear exchanger outlet temperature sensor, pre-cooled inlet pressure sensor, secondary heat exchanger outlet temperature sensor, turbine inlet temperature sensor, trim air regulated pressure sensor, air cycle machines (ACM) speed sensor, pack inlet pressure sensor, and ram door position sensor.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

Referring now to the appended drawings, FIG. 1 shows an exemplary overview of an example environment 100 according to one or more embodiments of the present disclosure. The environment 100 may, for example, include aircraft 105, sensors 110, third party weather data 113, ground data server 115, mobile application 120, and maintenance report 125. In the present environment, aircraft 105 transmit data obtained via sensors 110 to the ground data server 115. The ground data server 115 may be interfaced via the mobile application 120 to produce the maintenance report 125.

As discussed above, sensors 110 may be existing sensors or new sensors on the aircraft, and will be used to collect various data to be used by the ground data server 115 and mobile application 120. The set of sensors that may be used is illustrated in the following Table 1:

TABLE 1

| Sensor List, sampling rate is 1 Hz at the minimum for all | |
|---|---|
| COMPUTED AIRSPEED | ANALOG |
| LEFT RAM V | ANALOG |
| RIGHT RAM V | ANALOG |
| LEFT PACK V | ANALOG |
| RIGHT PACK V | ANALOG |
| PRECOOLER OUTLET TEMPERATURE - LEFT (ANALOG) | ANALOG |
| PRECOOLER OUTLET TEMPERATURE - RIGHT (ANALOG) | ANALOG |
| DUCT PRESSURE LEFT | ANALOG |
| DUCT PRESSURE RIGHT | ANALOG |
| APU TOTAL PRESSURE | ANALOG |
| PRESSURE ALTITUDE | ANALOG |
| TOTAL AIR TEMPERATURE | ANALOG |
| APU ROTOR SPEED | ANALOG |
| APU CORRECTED FLOW | ANALOG |
| ECS PACK ON/OFF NO 1 | DISCRETE |
| ECS PACK ON/OFF NO 2 | DISCRETE |
| CABIN DIFFERENTIAL PRESSURE (DPAC) | ANALOG |
| CABIN DIFFERENTIAL PRESSURE (DPAC) | ANALOG |
| LEFT ENG N1 TACH - ANALOG | ANALOG |
| ENG 2 BLEED SW | DISCRETE |
| ENG 1 BLEED SW | DISCRETE |
| WING ANTI ICE | DISCRETE |
| CABIN PRESSURE 2 | ANALOG |
| CABIN PRESSURE 1 | ANALOG |
| ECS ISOLATION VALVE | DISCRETE |
| RIGHT ECS PACK | DISCRETE |
| LEFT ECS PACK | DISCRETE |
| APU BLEED VALVE | DISCRETE |
| AIR/GROUND (1 = AIR) | DISCRETE |
| FLIGHT MODE (FLOATING POINT) | ANALOG |
| ENGINE SPEED FAN - ENG 1 | ANALOG |
| ENGINE SPEED FAN - ENG 2 | ANALOG |
| AUTO_CHANNEL_FAIL CPC #2 | DISCRETE |
| AUTO_CHANNEL_FAIL CPC #1 | DISCRETE |
| ENG 2 COWL ANTI ICE SW | DISCRETE |
| ENG 1 COWL ANTI ICE SW | DISCRETE |
| RIGHT ENG N1 TACH - ANALOG | ANALOG |
| RIGHT ECS PACK FLOW | DISCRETE |
| LEFT ECS PACK FLOW | DISCRETE |
| ECS PACK HIGH/LOW NO. 2 | DISCRETE |
| ECS PACK HIGH/LOW NO. 1 | DISCRETE |
| APU IGV POSITION | ANALOG |
| OUTFLOW VALVE POSITION (OFV_POS) CPC #1 | ANALOG |
| SELECTED LANDING FIELD ELEVATION (LFE) CPC#1 | ANALOG |
| APU TEMPERATURE T2 | ANALOG |
| APU SCV POSITION | DISCRETE |
| CABIN RATE - 1 | ANALOG |
| EXHAUST GAS TEMPERATURE - ENG 1 | ANALOG |
| AUTO IN CTRL CPC #1 | DISCRETE |
| EXHAUST GAS TEMPERATURE - ENG 2 | ANALOG |
| APU TEMPERATURE T5 | ANALOG |
| APU OIL TEMPERATURE | ANALOG |
| SELECT CRUISE FLIGHT LEVEL (CRFL) CPC #1 | DISCRETE |
| PACK TEMPERATURE CONTROL | DISCRETE |
| STANDBY TEMPERATURE CONTROL | DISCRETE |
| LH TCV OPEN SWITCH STATE | DISCRETE |
| LH TCV CLOSED SWITCH STATE | DISCRETE |

TABLE 1-continued

Sensor List, sampling rate is 1 Hz at the minimum for all

| | |
|---|---|
| LH TCV OPEN SWITCH STATE | DISCRETE |
| LH TCV CLOSED SWITCH STATE | DISCRETE |
| FLIGHT DECK TRIM VALVE OPEN SWITCH STATE | DISCRETE |
| FLIGHT DECK TRIM VALVE CLOSED SWITCH STATE | DISCRETE |
| FWD CABIN TRIM VALVE OPEN SWITCH STATE | DISCRETE |
| FWD CABIN TRIM VALVE CLOSED SWITCH STATE | DISCRETE |
| AFT CABIN TRIM VALVE OPEN SWITCH STATE | DISCRETE |
| AFT CABIN TRIM VALVE CLOSED SWITCH STATE | DISCRETE |
| LH RAM AIR TEMPERATURE | ANALOG |
| RH RAM AIR TEMPERATURE | ANALOG |
| LH WATER EXTRACTOR (PACK OUT) TEMPERATURE | ANALOG |
| RH WATER EXTRACTOR (PACK OUT) TEMPERATURE | ANALOG |
| LH PRIMARY HX OUTLET TEMPERATURE | ANALOG |
| RH PRIMARY HX OUTLET TEMPERATURE | ANALOG |
| LH SECONDARY HX OUTLET TEMPERATURE | ANALOG |
| RH SECONDARY HX OUTLET TEMPERATURE | ANALOG |
| LH PRECOOLER INLET PRESSURE (PI) | ANALOG |
| RH PRECOOLER INLET PRESSURE (PI) | ANALOG |
| LH PRIMARY HX INLET TEMPERATURE | ANALOG |
| RH PRIMARY HX INLET TEMPERATURE | ANALOG |
| LH TURBINE INLET TEMPERATURE | ANALOG |
| RH TURBINE INLET TEMPERATURE | ANALOG |
| TRIM AIR REGULATED PRESSURE | ANALOG |
| LH ACM SPEED | ANALOG |
| RH ACM SPEED | ANALOG |
| LH PACK INLET PRESSURE | ANALOG |
| RH PACK INLET PRESSURE | ANALOG |
| LH INLET RAM DOOR POSITION | DISCRETE |
| RH INLET RAM DOOR POSITION | DISCRETE |
| LH OUTLET RAM DOOR POSITION | DISCRETE |
| RH OUTLET RAM DOOR POSITION | DISCRETE |
| LH PACK OUTLET TEMPERATURE | ANALOG |
| RH PACK OUTLET TEMPERATURE | ANALOG |

It should be clear to one skilled in the arts that more sensors can be added to the list, or sensors can be taken off the list without affecting the functions of the ECS monitoring system.

As indicated above, FIG. 1 is provided merely as an example. Other examples are possible and may differ from what was described with regard to FIG. 1. The number and arrangement of devices and networks shown in FIG. 1 are provided as an example. In practice, there may be additional devices, fewer devices and/or networks, different devices and/or networks, or differently arranged devices and/or networks than those shown in FIG. 1. Furthermore, two or more devices shown in FIG. 1 (e.g., sensors 110, mobile application 120, and maintenance report 125) may be implemented within a single device, or a single device shown in FIG. 1 (e.g., mobile application 120) may be implemented as multiple, distributed devices. Additionally, or alternatively, a set of devices (e.g., one or more devices) of environment 100 may perform one or more functions described as being performed by another set of devices of environment 100.

FIG. 2 shows a focused block diagram of the exemplary environment. FIG. 2 may include an aircraft 210, which corresponds to the aircraft 105 as depicted in FIG. 1; ground data server 215, which corresponds to the ground data server 115 as depicted in FIG. 1; and mobile apps 216 which correspond to the mobile application 120 as depicted in FIG. 1. The aircraft 210 may include the environmental control system (ECS) 201, flight data acquisition unit 202, communications system 203, other member systems 204, and third party weather data 213. The environmental control system (ECS) 201, flight data acquisition until 202, communications system 203, and other member systems 204 make up the onboard system and provide the data input for the calculations to determine the health of the ECS. The ground data server 215 and mobile apps 216 are part of the ground system 220.

The various systems depicted in FIG. 2. will be described herein. The flight data acquisition unit 202 receives as input data miscellaneous temperatures, pressures, and control switch values from the ECS 201 and altitude, airspeed, location, engine and auxiliary power unit data, and other related information from other member systems 204. The flight data acquisition unit 202 collects the data in real-time and transmit reports to the communications system 203. The flight data acquisition unit may be represented by the existing flight data recording system and/or additional recording devices. The data inputted from the ECS 201 and other member systems 204 might be acquired from the sensors 110 as depicted in FIG. 1.

The communications system 203, after receiving the reports from the flight data acquisition unit 202, may transmit the reports to the ground system via wireless communication protocol. The communication could be via aircraft communications addressing and reporting system (ACARS), or it could be via VHF, satellite, broadband, 3G cellular network, 4G cellular network, 5G, wireless internet, or any other wireless communication protocol obvious to one ordinary skilled in the arts. The ground system 220 may be made up of ground data server 215 and mobile apps 216. The ground data server 215 may include an algorithm center and a database center, and it may also collect data from local weather information center. Once the ground data server 215 receives the reports from the onboard system, the algorithm center performs the analysis based on the ECS model, and saves the results to the database. The mobile apps 216 present the results of the analysis in a user interface for aircraft personnel. The user interface may use different colors to denote the various levels of attention needed. For example, a red color on the display may mean warning status, yellow color on the display may mean advisory status, and green color on the display may be normal status. The maintenance engineer or aircraft personnel may perform actions based on the levels of attention needed so that status with a red display will have priority over other statuses.

The number and arrangement of modules, devices, and networks shown in FIG. 2 are provided as an example. In practice, there may be additional modules and devices, fewer modules, devices and/or networks, different modules, devices and/or networks, or differently arranged modules, devices and/or networks than those shown in FIG. 2. Furthermore, two or more devices included in environment 200 of FIG. 2 may be implemented within a single device, or a single device in the environment 200 of FIG. 2 may be implemented as multiple, distributed devices. Additionally, or alternatively, a set of devices (e.g., one or more devices) of FIG. 2 may perform one or more functions described as being performed by another set of devices in environment 200 of FIG. 2.

FIG. 3A depicts a flowchart of an exemplary method 300A for analyzing and determining the health status of the aircraft system.

First, the exemplary method 300 may begin at step 301A with receiving aircraft data, e.g., supplied by the aircraft sensors 110 depicted in FIG. 1, the aircraft data may include miscellaneous temperature, pressures and control switch values of the aircraft, pack outlet or water extractor temperature, auxiliary power unit (APU) bleed pressure, auxiliary power unit bleed temperature, ambient pressure, and ambient temperature. At step 302A, flight data related to the aircraft may be received, where the flight data may include altitude, airspeed, location, engine and auxiliary power unit of the aircraft, and/or local weather data. At step 303A the input data may be fed into a system analytical model that calculates a predicted performance of the aircraft elements. At step 304A the calculated predicted performance of the aircraft elements may be compared with the measured performance of the aircraft elements, and at step 305A, the difference between the two may be determined and trended overtime. When the difference between the predicted performance and the measured performance exceeds a predetermined threshold value, then at step 306A, a maintenance report may be created and transmitted to a maintenance engineer or aircraft personnel.

An example of the method 300A will be described herein with respect to heat exchanger contamination monitoring. At steps 301A and 302A, many parameters may be fed into a system analytical model that predicts the nominal pack and heat exchanger performance (Step 303A). These parameters may include pack outlet or water extractor temperature, APU bleed pressure, APU bleed temperature, ambient pressure, and/or ambient temperature. Other parameters may be obtained from other sources, such as local weather data and date and time. The actual pack performance may be compared to the analytically-predicted nominal performance and the difference between the two may be trended over time (step 304A and 305A). Heat exchanger contamination may be identified by slow increases in the actual compressor outlet temperature compared to the analytically predicted nominal compressor temperature. A maintainer alert may be provided when this temperature rise continues over several weeks (Step 306A). This failure mode can be differentiated from other failure modes, such as an air cycle machine (ACM) fan blade failure, by tracking the rate of change in compressor temperatures. ACM failures typically have a sudden shift in compressor temperatures instead of the slower shifts that are associated with heat exchanger contamination.

Figure 3B:
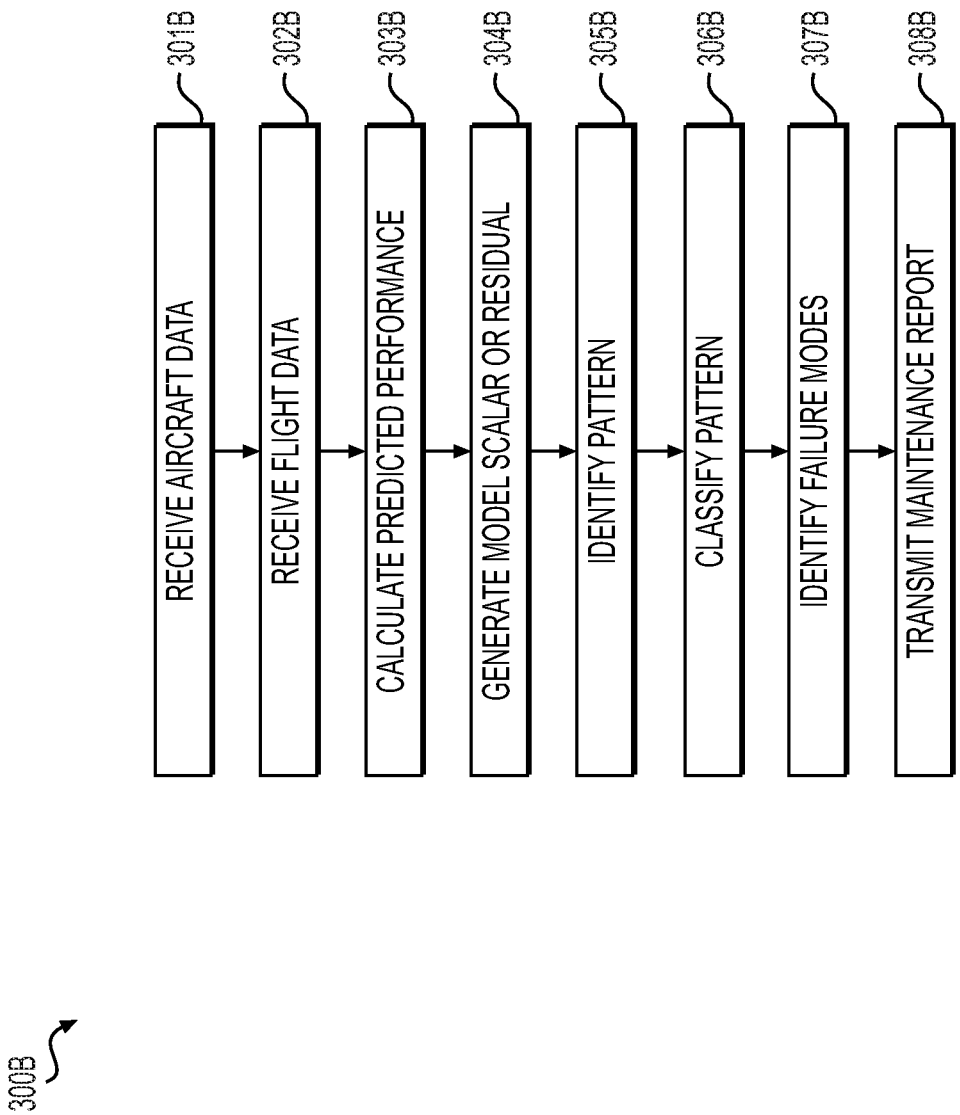
FIG. 3B depicts a flowchart of another exemplary method for ECS fault isolation.

FIG. 3B depicts a flowchart of an exemplary method 300B for analyzing and determining the health status of the aircraft system.

In another embodiment the model may be fed back into a machine learning method that uses large sets of data to improve accuracy of model prediction at certain operating conditions, and generate model scalars or residuals that behave differently depending on the type of failure modes and components, and classifying the patterns from the combination of differently behaving multiple scalars and residuals, which enables the isolation of failure modes and components.

First, the exemplary method 300B may begin at step 301B with receiving aircraft data, e.g., supplied by the aircraft sensors 110 depicted in FIG. 1, the aircraft data may include miscellaneous temperature, pressures and control switch values of the aircraft, pack outlet or water extractor temperature, auxiliary power unit (APU) bleed pressure, auxiliary power unit bleed temperature, ambient pressure, and ambient temperature. At step 302B, flight data related to the aircraft may be received, where the flight data may include altitude, airspeed, location, engine and auxiliary power unit of the aircraft, and/or local weather data. At step 303B the input data may be fed into a system analytical model that calculates a predicted performance of the aircraft elements. At step 304B a plurality of model scalars or residuals may be generated, and at step 305B, a pattern may be identified based on the plurality of scalars or residuals different behaviors. At step 306B those different behavior patterns may be classified based on the patterns. At step 307B, based on the classifications of the patterns, failure modes or components may be identified. For example isolating a component that might be failing due to the scalar readouts. At step 3068B a maintenance report may be created and transmitted to a maintenance engineer or aircraft personnel.

Although FIGS. 3A and 3B shows example blocks, in some implementations, process 300 may include additional blocks, fewer blocks, different blocks, or differently arranged blocks than those depicted in FIG. 3. Additionally, or alternatively, two or more of the blocks of process 300 may be performed in parallel.

FIG. 4 depicts an exemplary user interface 405 for a Smart Aircraft Conditioning Monitoring System (ACMS) recorder ("SAR").

As illustrated in FIG. 4, the interface 405 for SAR is presented to a user to collect data from various sensors on the aircraft. The SAR may include a plurality of fully user-programmable channels with a plurality of parameters and a plurality of programmable start/stop triggers per each channel. The benefit of using SAR may include programmable data compression which optimizes memory usage, user-definable pre-event history length, the ability to collect time series data, which allows identification of data in the stable range and define ACMS report trigger logic.

Figure 5:
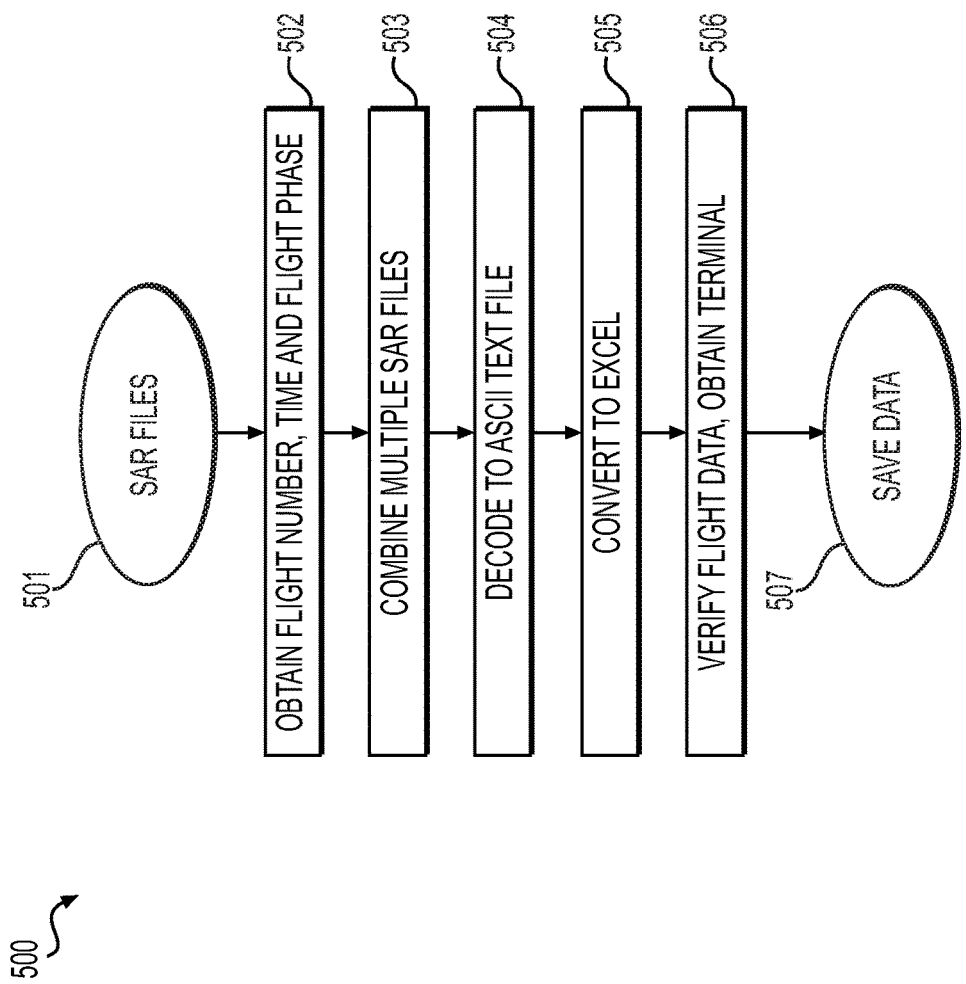
FIG. 5 depicts a flowchart of an exemplary method for decoding SAR data.

FIG. 5 depicts a flowchart of an exemplary method for decoding SAR data.

As illustrated in user interface 400 in FIG. 4 aircraft data may be collected using the SAR. Since SAR has the ability to acquire a large quantity of data over a long period, a readout tool may be used to export SAR data as a delimited ASCII text file for analysis with other ground-based computers via the following steps. At step 501, the SAR file is obtained to be read out, at step 502 flight number, time and flight phase data are obtained for a particular aircraft and flight. At step 503, multiple SAR files are combined together and then decoded to ASCII text file at step 504. At step 506 the ASCII text file is converted to excel format and then the flight data and terminal data are obtained and verified. Finally at step 507 the data is saved and may be used for analysis with other ground-based computers.

Figure 6B:
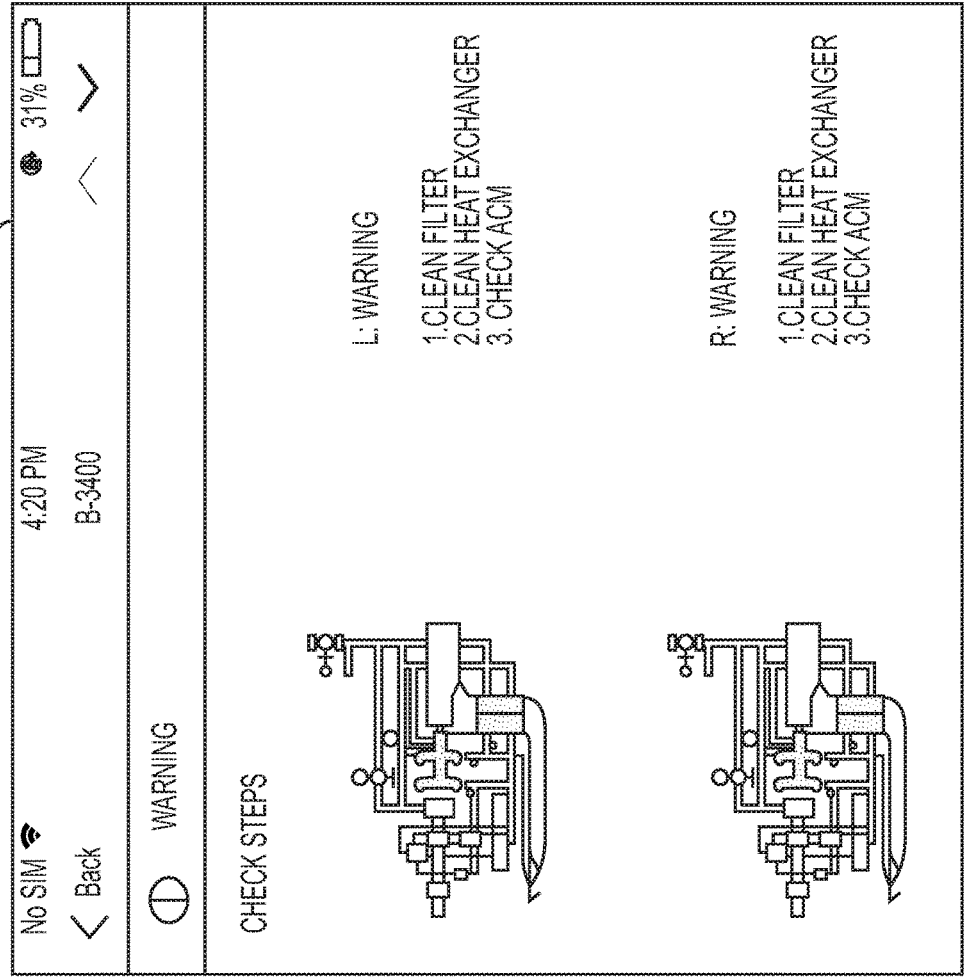
FIG. 6B depicts another exemplary user interface of the ECS Monitoring system.

FIGS. 6A and 6B depicts an exemplary user interface of the ECS Monitoring system.

As illustrated in FIG. 6A, user interface 600A shows an exemplary interface of a main page of the ECS Monitoring system in mobile apps. The main page may be a dashboard that displays the list of aircrafts owned by the airline. The first column shows the ECS health status, and each aircraft contains two duplicated ECS components, left and right. The health of the ECS is illustrated by different color codes, e.g. red color means warning status, yellow color means advisory status, green color means normal status. The different color code allows a maintenance engineer to perform actions based on severity level. The other columns in user interface 600A may be predefined based on an airline's request to show maintainer's interested parameters.

When a maintenance engineer selects one aircraft row, a corrective action page is then presented to the engineer, as illustrated in FIG. 6B. The user interface 600B guides the engineer to operate or replace the failing or faulty component step by step. For example as presented in 600B, a series of actions is presented to the engineer for the left and right ECS components. At step 1 the interface directs the engineer to clean the filer, and then at step 2 the heat exchanger should be cleaned, and finally at step 3 the engineer is directed to check ACM.

As illustrated in FIG. 6A, fault status may be displayed in the mobile application. An exemplary list of fault modes that may be available for the mobile application is illustrated in the following Table 2:

TABLE 2

| | | Failure mode | | |
|---|---|---|---|---|
| Bleed air system failure | Temp control valve failure | Trim Air Valve Failure | ACM Bearing Seized | ACM Fan Blade Loss |
| HX Contamination | HX Leakage | Ram Air Inlet/Outlet Actuator seized, notor/GB Failure | Pack Temp Sensor Failure | Compressor Temp Failure |

The failure modes can be detected from the list of sensors by observing the combination of these sensors reading behaviors. For example, a scenario where sensor A reads higher, sensor B reads lower and sensor C reads flat, can be compared to another scenario where sensor A reads higher, sensor B reads lower, and sensor C reads higher and a determination can be made from the variation in the readings. Pattern classification will be used to capture these patterns exhibited differently depending on the failure modes.

It should be clear to one skilled in the arts that more failure modes can be added to the list, or failure modes can be taken off the list without affecting the functions of the ECS monitoring system.

Figure 7:
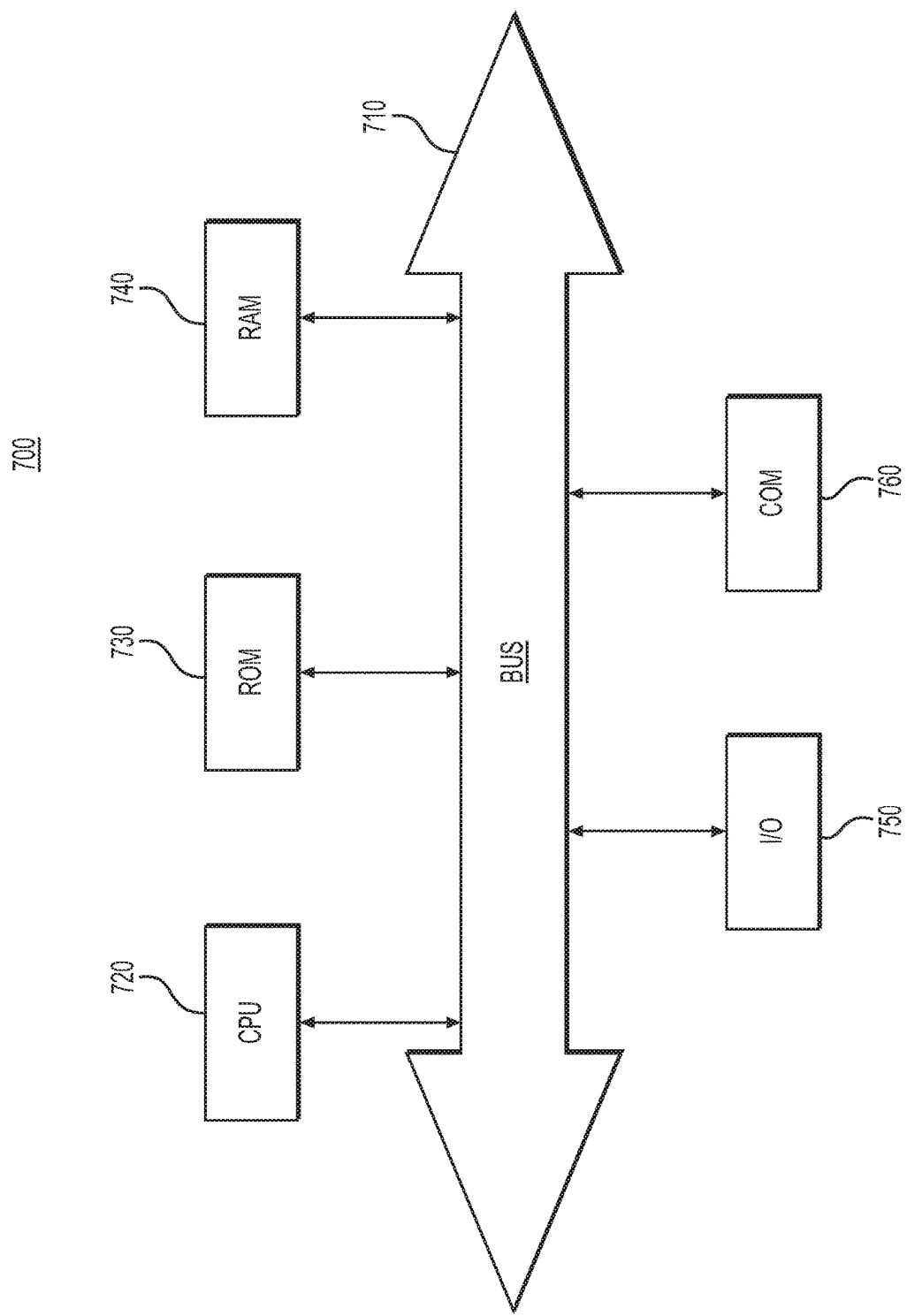
FIG. 7 depicts an exemplary computer device or system, in which embodiments of the present disclosure, or portions thereof, may be implemented

FIG. 7 depicts a high-level functional block diagram of an exemplary computer device or system, in which embodiments of the present disclosure, or portions thereof, may be implemented, e.g., as computer-readable code. In some implementations, the ground data server (depicted in FIGS. 1 and 2) may correspond to device 700. Additionally, each of the exemplary computer servers, databases, user interfaces, modules, and methods described above with respect to FIGS. 1-6 can be implemented in device 700 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-6.

If programmable logic is used, such logic may be executed on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor or a plurality of processors, or combinations thereof. Processor devices may have one or more processor "cores."

Various embodiments of the present disclosure, as described above in the examples of FIGS. 1-6, may be implemented using device 700. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 7, device 700 may include a central processing unit (CPU) 720. CPU 720 may be any type of processor device including, for example, any type of special purpose or a general-purpose microprocessor device. As will be appreciated by persons skilled in the relevant art, CPU 720 also may be a single processor in a multi-core/multi-processor system, such system operating alone, or in a cluster of computing devices operating in a cluster or server farm. CPU 720 may be connected to a data communication infrastructure 710, for example, a bus, message queue, network, or multi-core message-passing scheme.

Device 700 also may include a main memory 740, for example, random access memory (RAM), and also may include a secondary memory 730. Secondary memory 730, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 730 may include other similar means for allowing computer programs or other instructions to be loaded into device 700. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 700.

Device 700 also may include a communications interface ("COM") 760. Communications interface 760 allows software and data to be transferred between device 700 and external devices. Communications interface 760 may include a modem, a network interface (such as an Ethernet card), a communications port, a PCMCIA slot and card, or the like. Software and data transferred via communications interface 760 may be in the form of signals, which may be electronic, electromagnetic, optical, or other signals capable of being received by communications interface 760. These signals may be provided to communications interface 760 via a communications path of device 700, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 700 also may include input and output ports 750 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A computer implemented method for detecting health status of an environmental control system, the method comprising:
   receiving, by a processor, aircraft data of an aircraft;
   receiving, by the processor, flight data of the aircraft;
   calculating, by the processor, a predicted performance of the aircraft based on the received aircraft data and the received flight data using a system analytical model;
   generating, by the processor, at least one model scalar, wherein the at least one model scalar is generated based on the aircraft data of the aircraft and the predicted performance;
   identifying, by the processor, at least one pattern from the at least one model scalar;
   classifying, by the processor, the at least one pattern into at least one of a plurality of classifications;
   identifying, by the processor, a failure of modes or components from the classifications; and
   transmitting, by the processor, a maintenance report once the failure of modes or components is identified.

2. The method of claim 1, wherein the aircraft data include at least one of miscellaneous temperature, pressures and control switch values of the aircraft, pack outlet or water extractor temperature, auxiliary power unit bleed pressure, auxiliary power unit bleed temperature, ambient pressure, and/or ambient temperature.

3. The method of claim 1, wherein the flight data include at least one of altitude, airspeed, location data, engine data, auxiliary power unit data, and/or weather data.

4. The method of claim 1, wherein the at least one model scalar or residual is generated by a machine learning model.

5. The method of claim 1, further include transmitting instructions on replacement or repair of the failure modes or components.

6. The method of claim 1, wherein receiving the aircraft data and the flight data further include receiving via a plurality of channels with a plurality of parameters of the aircraft.

7. The method of claim 6, wherein the plurality of channels further include a plurality of programmable start/stop triggers per each of the plurality of channels.

8. A computer implemented method for detecting health status of an environmental control system, the method comprising:
   receiving, by a processor, aircraft data of an aircraft;
   receiving, by the processor, flight data of an aircraft;
   calculating, by the processor, a predicted performance of the aircraft based on the received aircraft data and the received flight data;
   comparing, by the processor, the predicted performance of the aircraft with a measured performance of the aircraft over a predetermined time period;
   determining, by the processor, a difference between the predicted performance of the aircraft and the measured performance of the aircraft over the predetermined time period;
   transmitting, by the processor, a maintenance report once the determined difference is greater than a predetermined threshold; and
   transmitting instructions on replacement or repair of a failure of modes or components.

9. The method of claim 8, wherein the aircraft data include at least one of miscellaneous temperature, pressures and control switch values of the aircraft, pack outlet or water extractor temperature, auxiliary power unit bleed pressure, auxiliary power unit bleed temperature, ambient pressure, and/or ambient temperature.

10. The method of claim 8, wherein the flight data include at least one of altitude, airspeed, location data, engine data, auxiliary power unit data, and/or weather data.

11. The method of claim 8, wherein receiving the aircraft data and the flight data further include receiving via a plurality of channels with a plurality of parameters of the aircraft.

12. The method of claim 11, wherein the plurality of channels further include a plurality of programmable start/stop triggers per each of the plurality of channels.

13. A computer system for detecting health status of an environmental control system, the computer system comprising:
   a memory having processor-readable instructions stored therein; and
   at least one processor configured to access the memory and execute the processor-readable instructions, which when executed by the processor configures the processor to perform a plurality of functions, including functions for:
   receiving aircraft data of an aircraft;
   receiving flight data of the aircraft;
   calculating a predicted performance of the aircraft based on the received aircraft data and the received flight data;
   generating at least one model scalar, wherein the at least one model scalar is generated based on the aircraft data of the aircraft;
   identifying at least one pattern from the at least one model scalar;
   classifying the at least one pattern into at least one of a plurality of classifications;
   identifying a failure of modes or components from the classifications; and
   transmitting a maintenance report once the failure of modes or components is identified.

14. The computer system of claim 13, wherein the aircraft data include at least one of miscellaneous temperature, pressures and control switch values of the aircraft, pack outlet or water extractor temperature, auxiliary power unit bleed pressure, auxiliary power unit bleed temperature, ambient pressure, and/or ambient temperature.

15. The computer system of claim 13, wherein the flight data include at least one of altitude, airspeed, location data, engine data, auxiliary power unit data, and/or weather data.

16. The computer system of claim 13, wherein the at least one model scalar or residual is generated by a machine learning model.

17. The computer system of claim 13, wherein the functions further include transmitting instructions on replacement or repair of the failure modes or components.

18. The computer system of claim 13, wherein receiving the aircraft data and the flight data further include receiving via a plurality of channels with a plurality of parameters of the aircraft.

19. The computer system of claim 18, wherein the plurality of channels further include a plurality of programmable start/stop triggers per each of the plurality of channels.

* * * * *